United States Patent
Sorbi et al.

(10) Patent No.: US 10,086,960 B2
(45) Date of Patent: Oct. 2, 2018

(54) DIAGNOSTIC KIT AND METHOD FOR CONTAINER PROCESSING MACHINE

(71) Applicant: SIDEL PARTICIPATIONS S.A.S., Octeville-sur-Mer (FR)

(72) Inventors: Federica Sorbi, Parma (IT); Michele Ollari, Parma (IT); Alessandro Gorbi, Parma (IT)

(73) Assignee: Sidel S.p.A. Con Socio Unico, Parma (IT)

( * ) Notice: Subject to any disclaimer, the term of this patent is extended or adjusted under 35 U.S.C. 154(b) by 219 days.

(21) Appl. No.: 15/052,975

(22) Filed: Feb. 25, 2016

(65) Prior Publication Data

US 2016/0257437 A1    Sep. 8, 2016

(30) Foreign Application Priority Data

Mar. 3, 2015   (EP) ..................... 15157486

(51) Int. Cl.
| | |
|---|---|
| *G06F 11/30* | (2006.01) |
| *B65B 3/26* | (2006.01) |
| *G01M 3/26* | (2006.01) |
| *B67C 3/00* | (2006.01) |
| *G05B 19/418* | (2006.01) |

(Continued)

(52) U.S. Cl.
CPC ............... *B65B 3/26* (2013.01); *B67C 3/007* (2013.01); *G01M 3/26* (2013.01); *G05B 19/418* (2013.01); *G06Q 10/06* (2013.01); *G07C 3/00* (2013.01)

(58) Field of Classification Search
None
See application file for complete search history.

(56) References Cited

U.S. PATENT DOCUMENTS

2009/0300417 A1   12/2009   Bonissone et al.

FOREIGN PATENT DOCUMENTS

| DE | 10 2009 025855 A1 | 12/2009 |
|---|---|---|
| EP | 2 803 623 A1 | 11/2014 |

(Continued)

OTHER PUBLICATIONS

Extended European Search Report dated Aug. 24, 2015 by the European Patent Office in counterpart European Patent Application No. 15157486.0.

(Continued)

*Primary Examiner* — Cory Eskridge
(74) *Attorney, Agent, or Firm* — Finnegan, Henderson, Farabow, Garrett & Dunner LLP

(57) ABSTRACT

A diagnostic method for a container processing machine including a rotating conveyor, and processing units carried by the rotating conveyor and designed to engage at least one container to carry out processing operations is disclosed. The method includes operatively coupling a first set of monitoring sensors to the processing units on-board the processing machine to monitor relevant operating parameters. The method also includes controlling the processing units to execute test operations in lieu of processing operations. The method further includes acquiring measurement data from the first set of monitoring sensors during the test operations. The method further includes processing the acquired measurement data to provide maintenance information on the reliability of at least one of the processing units or the processing machine.

20 Claims, 10 Drawing Sheets

(51) Int. Cl.
*G06Q 10/06* (2012.01)
*G07C 3/00* (2006.01)

(56) References Cited

FOREIGN PATENT DOCUMENTS

| | | | |
|---|---|---|---|
| JP | 2006 298382 A | | 11/2006 |
| JP | 2006298382 A | * | 11/2006 |

OTHER PUBLICATIONS

Meheen, "M4 & M6 Bottle Filling Machine Operating Manual", Meheen, pp. 1-25, Jun. 2014.

* cited by examiner

# DIAGNOSTIC KIT AND METHOD FOR CONTAINER PROCESSING MACHINE

CROSS-REFERENCE TO RELATED APPLICATIONS

This application claims the benefit of priority of European Patent Application No. 15157486.0, filed on Mar. 3, 2015, which is incorporated herein by reference.

TECHNICAL FIELD

The present invention relates to a diagnostic kit for monitoring the operating status and reliability of a container processing machine and to a related diagnostic method; in particular, the present invention will make explicit reference, without this implying any loss of generality, to a filling machine in a bottling plant, designed to fill containers with a pourable product.

In general, however, the present invention may be used in machines for processing any type of container, such as containers or bottles made of glass, plastics (PET), aluminum, steel and composites, and with any type of pourable products, including carbonated liquids, such as sparkling water, soft drinks, beer; non-carbonated liquids, such as still water, juices, teas, sport drinks, wine; liquid cleaners, emulsions, suspensions, or high viscosity liquids.

BACKGROUND

In the field of bottling of liquids, a system is known comprising a feed line for feeding a succession of empty containers to a filling machine, in turn comprising a rotating conveyor (so called "carousel"), carrying a number of filling units. The filling units are mounted to rotate continuously about a longitudinal axis, engage the empty containers, fill the containers with the desired product, and then feed the containers to a capping machine, which is coupled to the filling machine by at least one transfer wheel and which closes the containers with respective caps; a labeling machine may also be present, to apply labels to an external surface of the containers. In case of carbonated liquids, filling operations may include also feeding pressurized gas, such as carbon dioxide, into the containers to pressurize them, before filling the same containers with a carbonated liquid; and, afterwards, decompressing the filled containers.

The Applicant has realized that monitoring the operating status of container processing machines on-site, i.e. during their operation in the processing plant, in particular with the alia of determining or predicting their reliability and maintenance and overhaul requirements; may often prove to be a difficult task.

In particular, while sensors and other electric/electronic components are used on-site in the processing machines to evaluate the operations performed in terms of their result (e.g., in case of filling operations, in terms of the quality of the filled product, for example the amount of liquid introduced in the container, the filling level, etc.), the Applicant has realized a lack of solutions that allow monitoring the operating status of the processing machines with the aim of evaluating their reliability and maintenance requirements.

In particular, it may prove to be difficult, also due to the generally limited time available to perform the monitoring operations and due to the lack of suitable tools and equipment, to perform quantitative measures relating to the operation of the processing machines, and to identify component(s) that are faulty or may be subject to faults in the near future.

Therefore, it is not impossible for the processing machines to be subjected to decreased performance or even to failures, with consequent decreased throughput, or even stops, of the processing plant.

BRIEF SUMMARY

The aim of the present, solution is consequently to solve, at least in part, the problems previously highlighted, and in general to allow an improved monitoring and maintenance of container processing machines in a processing plant.

According to the present solution, a diagnostic kit and a related diagnostic method are provided, as defined in the appended claims.

BRIEF DESCRIPTION OF THE DRAWINGS

For a better understanding of the present invention, preferred embodiments thereof are now described, purely by way of non-limiting examples, with reference to the attached drawings, wherein.

DETAILED DESCRIPTION

As previously underlined, the following description will make particular reference to an embodiment of the present invention in connection with a filling machine; however, it is underlined, that what will be discussed in the following finds general application also to other types of container processing machines.

Figure 1:
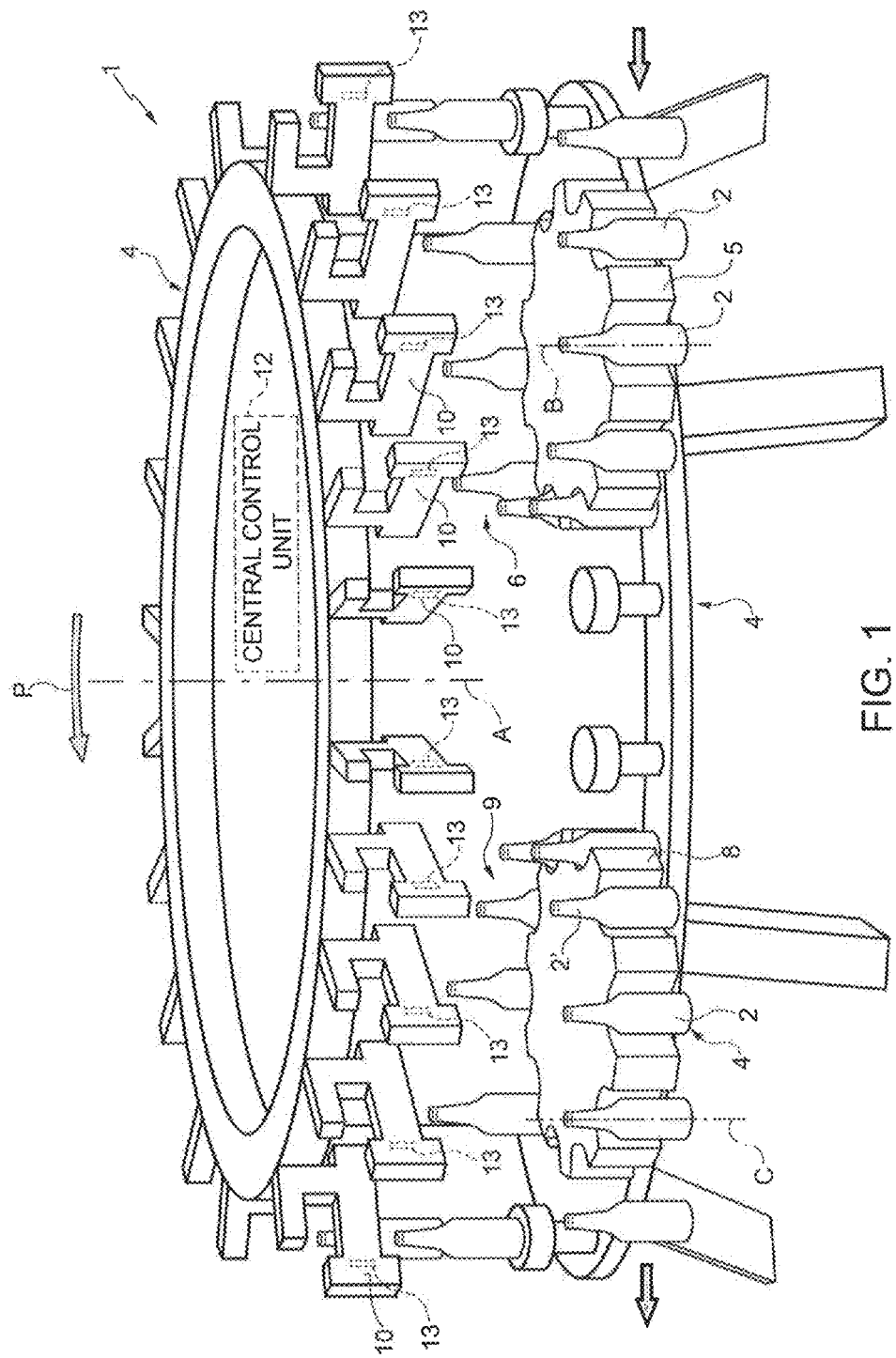
FIG. 1 is a schematic view of a filling machine, whose operation may be monitored through the diagnostic kit and method according to the present invention.

FIG. 1 schematically shows a filling machine of a container processing plant, denoted as a whole with 1 and configured for filling containers 2, for example glass bottles, with a filling fluid, for example a carbonated pourable food product (but it is again underlined that other types of containers and carbonated, or non-carbonated, liquids may as well be envisaged).

Filling machine 1 comprises a conveying device, including a rotating conveyor (or carousel) 4, which is mounted to rotate continuously (anticlockwise in FIG. 1) about a substantially vertical longitudinal axis A.

The rotating conveyor 4 receives a succession of empty containers 2 (e.g. originating from a container forming machine of the processing plant) from an input wheel 5, which is coupled thereto 4 at a first transfer station 6 and is mounted to rotate continuously about a respective vertical longitudinal axis B, parallel to axis A.

The rotating conveyor 4 releases a succession of filled containers 2 to an output wheel 8 (e.g. so as to be received by a labeling machine and/or a capping machine of the processing plant), which is coupled thereto at a second transfer station 9 and is mounted to rotate continuously about a respective vertical longitudinal axis C, parallel to axes A and B.

Filling machine 1 comprises a number of filling units 10, which are equally spaced about axis A, are mounted along a peripheral edge of rotating conveyor 4, and are moved by the same rotating conveyor 4 along a path P extending about axis A and through transfer stations 6 and 9.

Each filling unit 10 is designed to receive at least, one container 2 to be filled, and to perform, during its rotation along path P, filling operations according to a filling "recipe", in order to fill the container with a fluid (e.g. a carbonated liquid); the recipe may include steps of pressurization or depressurization of the container, opening/closing of valves, displacement of movable elements, activation of actuators and so on.

Each filling unit 10 generally includes one or more fluidic conduits and flow regulators (here not shown), including valves that are designed to selectively couple the container to one or more feed devices, or product tanks (also not shown), of the filling machine 1.

In a manner not shown in detail, each filling unit 10 includes a main body, for example with a tubular configuration, having a vertical extension along a longitudinal axis that is substantially parallel to axis A of rotating conveyor 4, and mechanically coupled to the rotating conveyor 4. The main body includes, at a bottom portion thereof, a container receiving part, designed to releasably engage a neck of the container 2 that is to be filled during the filling operations.

Operation of the filling units 10 is controlled by a central control unit 12 (shown schematically), designed to control general operation of the filling machine 1, e.g. providing suitable control signals for the actuation of the flow regulators in order to cause execution of the desired filling recipe.

Moreover, filling units 10 are generally provided with local control units 13 (shown schematically), designed to receive control signals from the central control unit 12, e.g. in order to control actuation of the corresponding valves and actuators, and designed to provide feedback signals to the same central control unit 12.

Electrical communication between the central control unit 12 and the local control units 13 is performed through a communication bus, for example a serial bus (here not shown).

Figure 2:
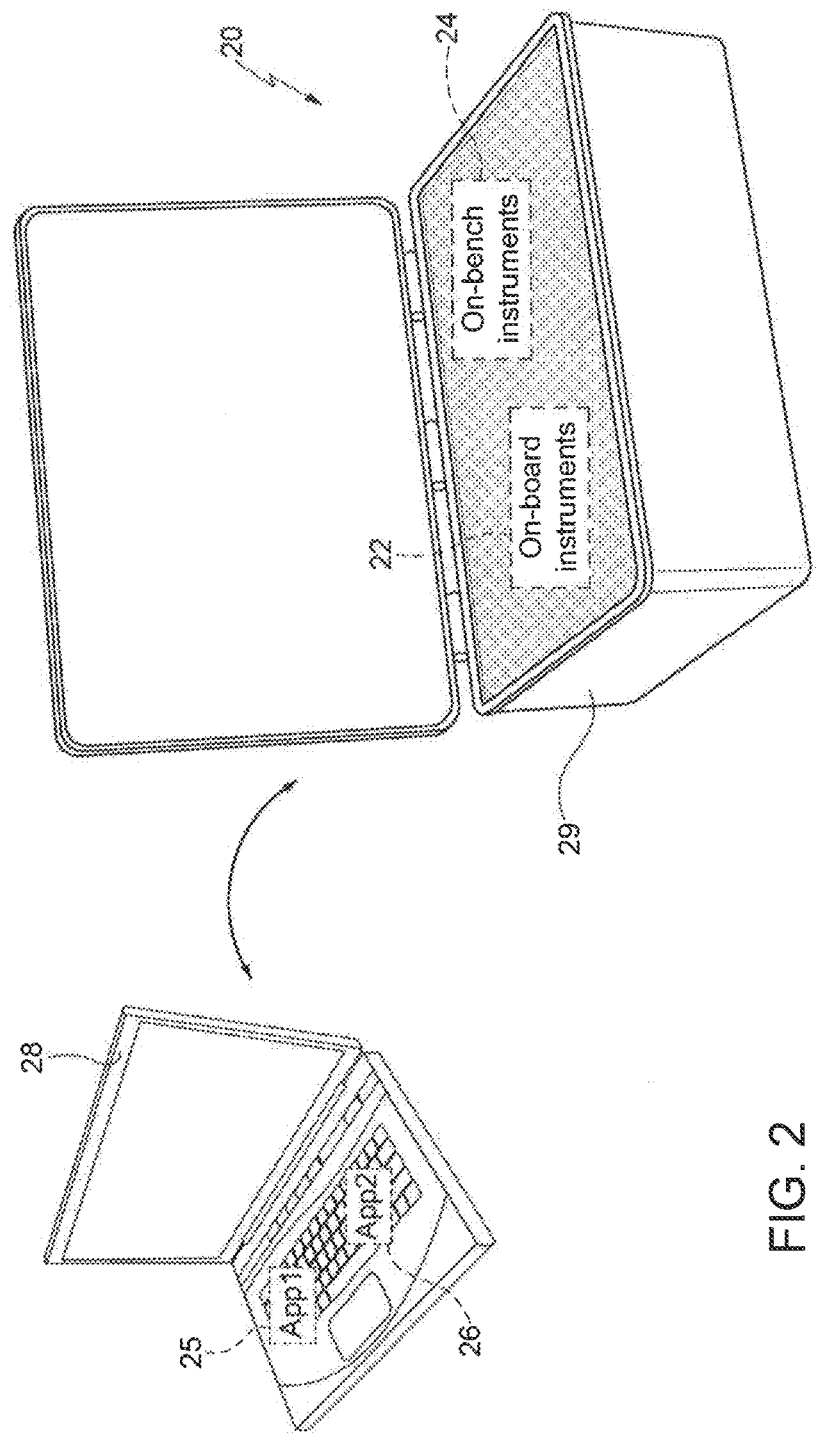
FIG. 2 is a schematic representation of a diagnostic kit, according to a possible embodiment of the present solution.

According to one embodiment of the present solution, and with reference also to FIG. 2, a diagnostic kit 20 for a container processing machine, for example the filling machine 1 of FIG. 1, includes:

a first set 22 of monitoring instruments, configured to be coupled to the filling machine 1 on-board the rotating conveyor 4 to command, control and process test measurements of the filling units 10, without requiring demounting of the same filling units 10 from the filling machine 1;

a second set 24 of monitoring instruments, configured to command, control and process test, measurements on-bench, i.e. on one or more of the filling units 10, demounted from the rotating conveyor 4, and considered singularly for the monitoring measurements;

a first software application 25, configured to manage the tests and acquire data relating to the test measurements performed, both from the first set 22 and from the second set 24 of monitoring instruments; and a second software application 26, configured to process the acquired data, in order to perform maintenance and reliability evaluations on the filling units 10 under test.

A third software application may be envisaged to perform statistical analysis, or the same second software application 25 may also be configured to perform statistical analysis.

The first and second, software applications 25, 26 (and any further software applications) are designed to be executed on a suitable processing device 28, such as a personal computer (FC) or any other mobile processing apparatus, implementing a user interface and provided with input means (e.g. a keyboard) and output means (e.g. a display).

According to a particular aspect of the present solution, the first set 22 and the second set 24 of monitoring instruments are configured to be housed in a case 29, in a compact and portable arrangement (e.g. the case 29 having external dimensions of about 60×50×30 cm). Case 29 may also house processing device 28, loaded with the first and second software applications 25, 26.

As will be detailed in the following, in a possible embodiment, monitoring tests and measurements performed by diagnostic kit 20 includes: tests on the pneumatic/hydraulic functionality of the valves in the filling units 10, executed, on-board (by the first set 22 of measuring instruments) and/or on-bench (by the second set 24 of measuring instruments); tests on the sealing properties of the filling units 10, again executed, on-board and/or on-bench; optical tests, e.g. on the displacement of moving parts of the filling units 10 (e.g. of centering bells of the filling units 10, designed for centering the containers 2 that are being filled); and/or tests on the data communication between filling units 10 and the control unit 12 of the filling machine 1 (e.g. via the serial communication protocol).

Figure 3:
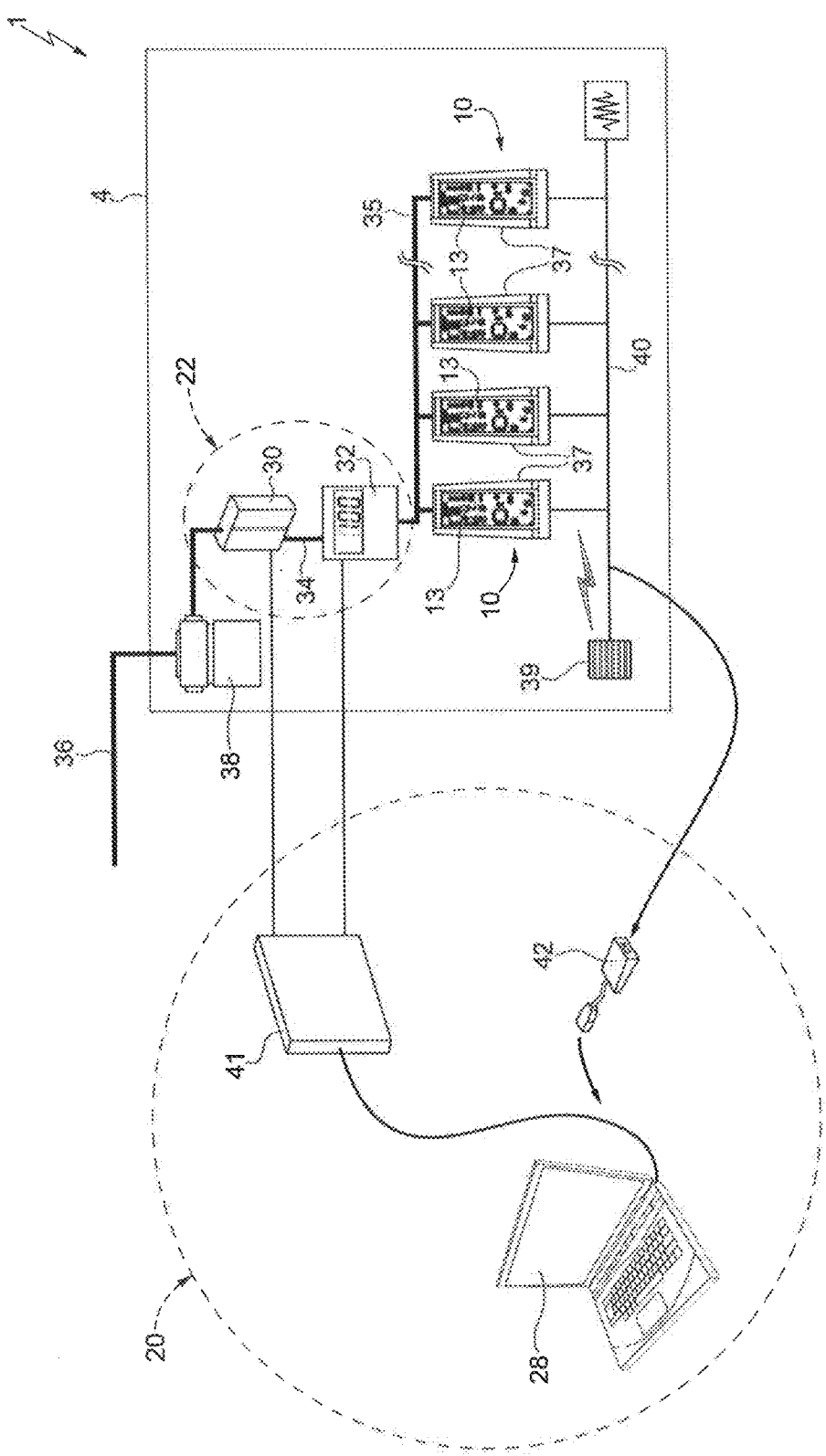
FIG. 3 is a diagrammatic representation of a first set of measuring instruments of the diagnostic kit, coupled to a filling machine, to execute on-board tests.

FIG. 3 schematically shows the arrangement of the first set 22 of monitoring instruments, according to a possible embodiment of the present solution, coupled to the filling units 10 of filling machine 1, on board of the rotating conveyor 4.

The first set 22 of monitoring instruments includes, in the discussed embodiment, at least one air flowmeter 30 and at least one pressure sensor 32, which are coupled to a pneumatic connecting line 34, arranged between a distribution line 35 and an input line 36 of the filling machine 1.

Filling units 10 are coupled to the distribution line 35, in particular via respective pilot valves 37, in order to receive pneumatic commands from the input line 36.

A first slip ring 38 couples the connecting line 34 to the input line 36; a second slip ring 39 is coupled to an electrical connection line 40, which carries electrical signals to and from the local control units 13 of the filling units 10, e.g. through a serial communication bus.

Processing device 28 of the diagnostic kit 20 is in this case provided with: a data acquisition device 41 for electrical connection to the air flowmeter 30 and pressure sensor 32, in order to acquire measurement data; and a digital interface 42 for electrical connection to the electrical connection line 39, e.g. including a serial communication adapter.

Processing device 28 is designed to provide control signals to the local control units 13 and/or pilot valves 37 of the filling units 10, bypassing, during monitoring tests and measurements, control signals coming from the central control unit 12 of the filling machine 1.

The first set 22 of monitoring instruments of the diagnostic kit 20 allows performing diagnostic tests without removing the filling units 10 from the rotating conveyor 4, during a monitoring and testing procedure (operatively distinct with respect to the filling operations usually performed by the same filling units 10, which are suspended in order to perform the tests).

In particular, by means of the air flowmeter 30 and the pressure sensor 32, it is possible to detect and measure possible air leaks in ail pneumatic components and product gaskets of the filling units 10 being monitored, for example leakage of valves and other constituent elements like centering bell and/or plunger's piston.

Processing device 28, implementing the first software application 25, is configured to control the pilot valves 37 to perform a sequence of test operating steps (a so called testing recipe) on one or more of the filling units 10, and to acquire measurements from the air flowmeter 30 and pressure sensor 32; the same processing device 28, implementing the second software application 26, is configured to process the acquired data in order to detect any possible leakage (or any other faults) in the components of each filling unit 10.

Test operating steps may include, for example, opening and closing of the valves, upwards or downwards displacement of the centering bells, application of a low or high operating speed, depending on the particular type and configuration of the filling units 10 and pneumatic components thereof.

Advantageously, execution of the tests is fast (few seconds for each filling unit 10), and it is possible to have a clear identification of the air leaks (or any other fault of the filling units 10 and/or the container processing machine).

Figure 4:
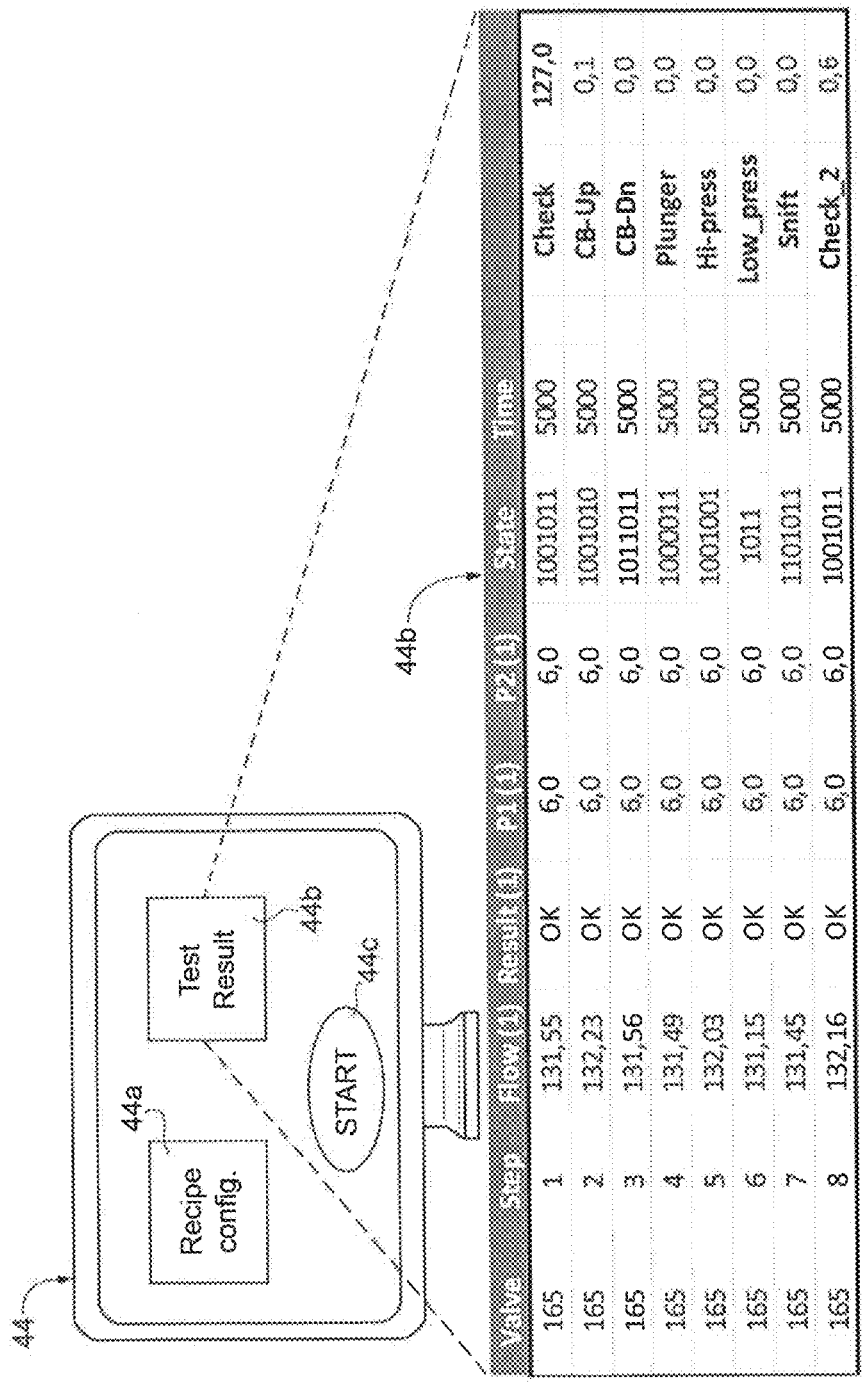
FIG. 4 schematically shows a user interface of a processing device implementing on-board tests of the diagnostic method.

As schematically shown in FIG. 4, processing device 28 is configured to display in the user interface, here denoted with 44: a first portion 44a, allowing the user to configure the resting recipe and the various operating steps for each filling unit 10; a second portion 44b, where testing results are presented to the user; at least a start button 44c, to initiate the tests on the filling units 10.

The enlarged portion of FIG. 4 shows exemplary results that may be displayed in the second portion 44b of the user interface 44, showing, for a particular filling unit 10 and the various steps of the testing recipe, measured pressure and flow values and a measure of the detected air leaks, so that the user may immediately and clearly identify possible sealing issues.

Advantageously, the measured values may be compared to a reference or "zero" value, in order to detect leakages based on the difference with respect to the reference value.

Figure 5A:
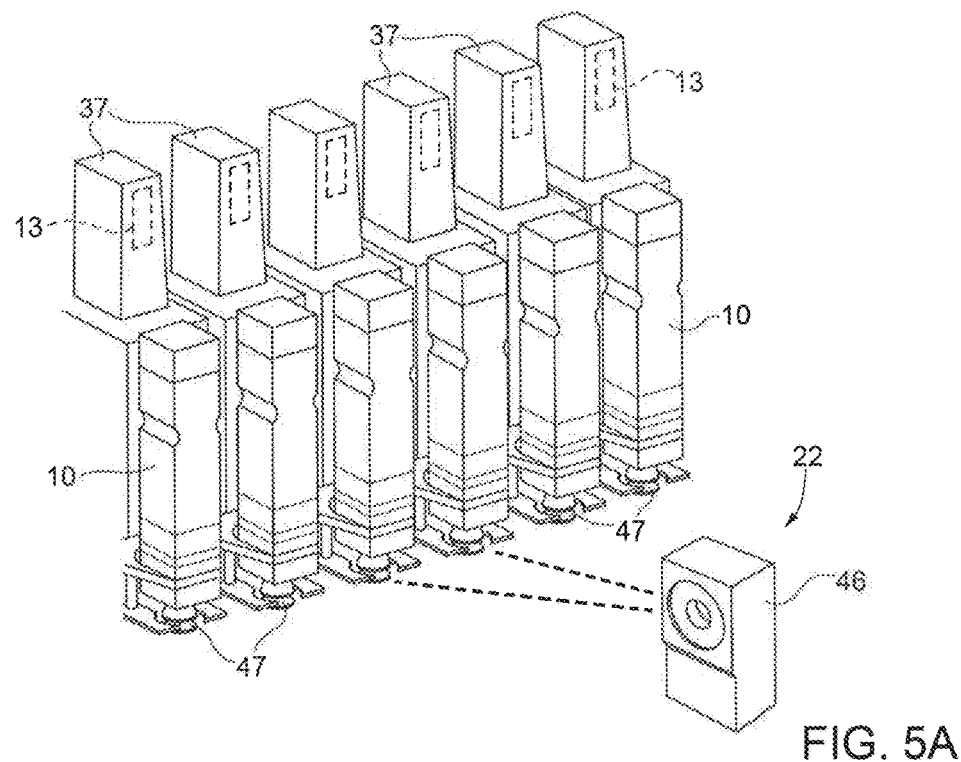
FIG. 5a shows a camera of the diagnostic kit, imaging filling units of the filling machine.
Figure 5B:
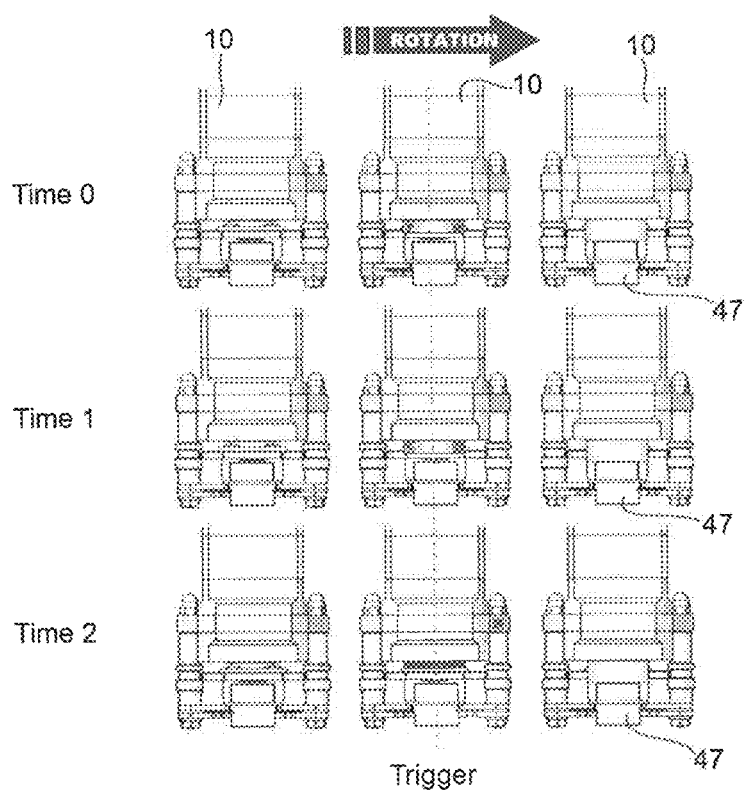
FIG. 5b shows images taken at different times by the camera during rotation of the filling machine.

As schematically shown in FIG. 5a, according to a possible embodiment of the present solution, the first set 22 of monitoring instruments of the diagnostic kit 20 may further include a camera 46 (or a laser system, or any other optical imaging system), that is suitably arranged to view the filling units 10 on the rotating conveyor 4, and take consecutive images of one or more components (e.g. a centering bell) of the same filling units 10 daring their rotation, referred to a trigger, as schematically shown in FIG. 5b.

Processing device 28 is in this case further configured to process the acquired images in order to test proper operation of moving parts of the filling units 10, e.g. of the centering bells thereof, here denoted with reference 47.

The second set 24 of monitoring instruments, according to a possible embodiment of the present solution, is now discussed with reference to FIG. 6a, which schematically shows the arrangement of the second set 24 of monitoring instruments coupled to a specific filling unit 10 of the filling machine 1, that has been demounted from the rotating conveyor 4 in order to perform additional and more detailed tests of its operation.

In particular, the specific filling unit 10 may have been identified as faulty following the results of the tests and monitoring performed by the first set 22 of monitoring instruments, for example due to a detected air leak in one or more of the pneumatic components thereof, or due to an anomalous operation of one or more of the moving components.

In particular, a test bench for the filling unit 10 includes a supporting frame 50 (here shown schematically), designed to support in a vertical position, the filling unit 10, and a dummy, or fake, container 51, coupled to the bottom portion of the main body of filling unit 10.

The second set 24 of monitoring instruments includes, in this embodiment: at least one pressure sensor 52, which is designed to measure the pressure at the neck of the fake container 51, during the monitoring tests; at least a first and a second flowmeters 53, 54; and an optical sensor 63, in particular a laser sensor, configured to measure position and displacement velocity of moving parts of the filling unit 10.

Optical sensor 63 may be arranged, facing the filling unit 10 mounted on the supporting frame 50. In general, the monitoring instruments of the second set 24 may be conveniently supported on the supporting frame 50, in a desired position with respect to the filling unit 10.

Figure 6A:
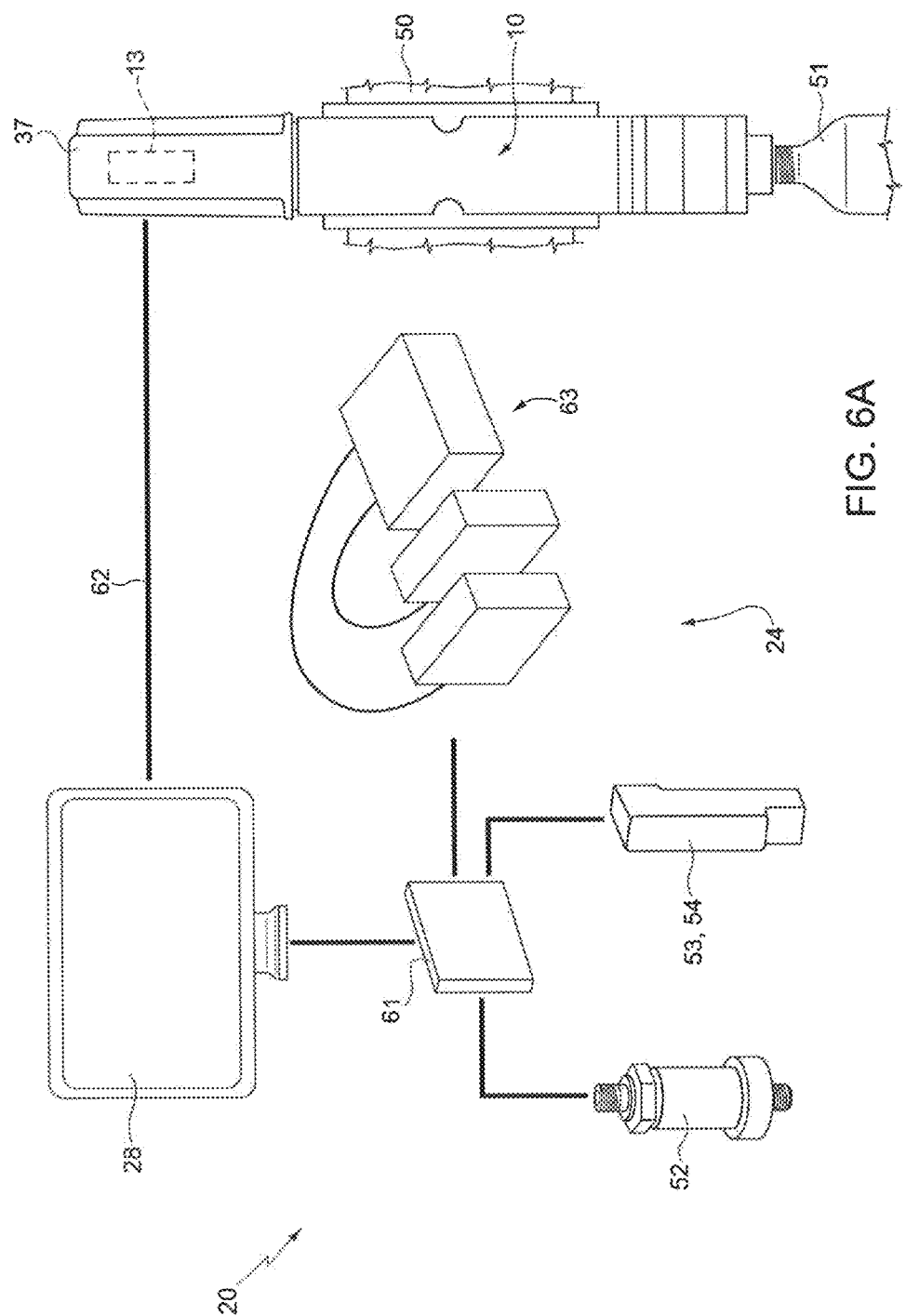
FIG. 6a is a diagrammatic representation of a second set of measuring instruments of the diagnostic kit, coupled to a filling unit, to execute on-bench tests.
Figure 6B:
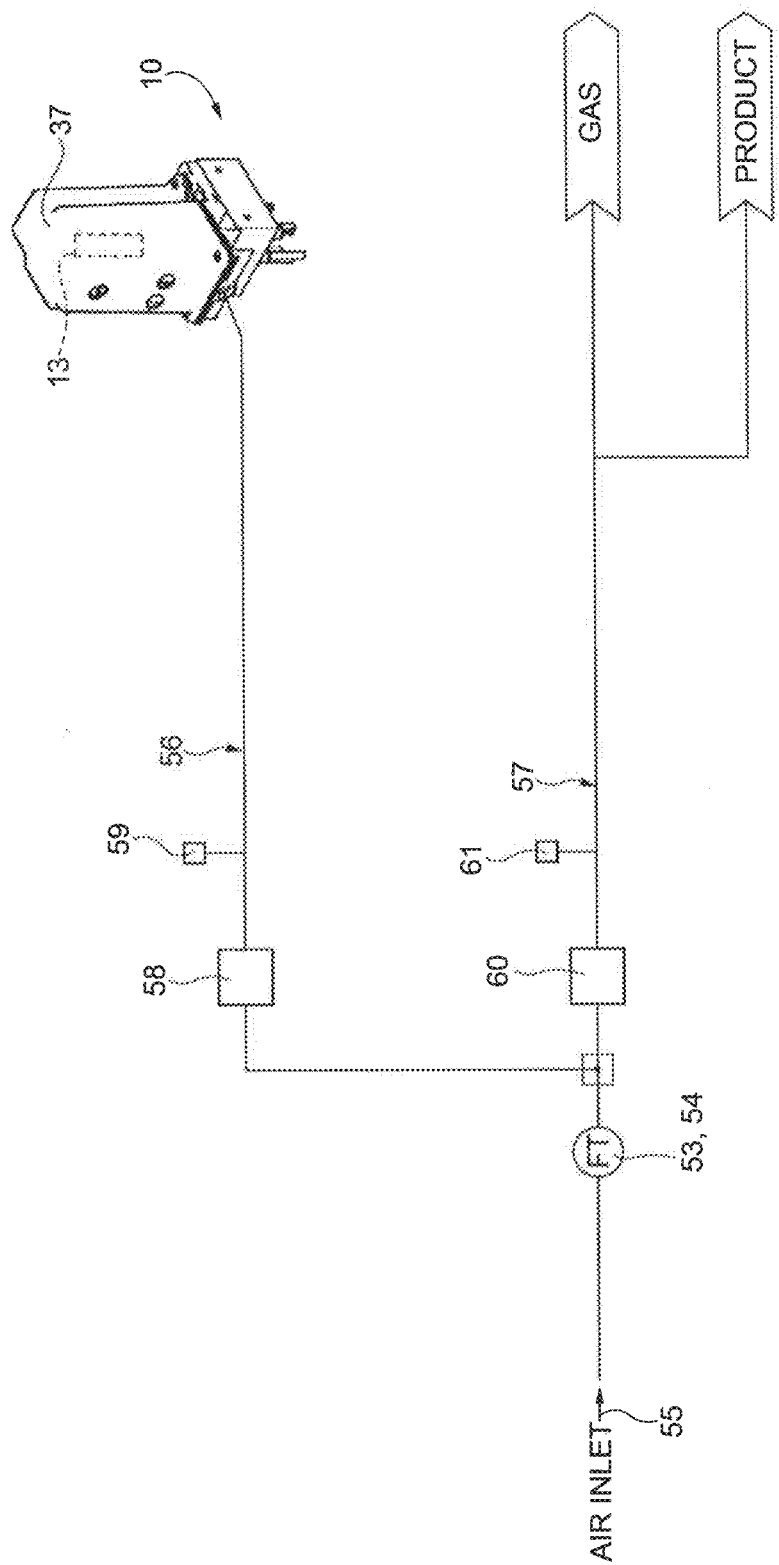
FIG. 6b is a schematic representation of a pneumatic arrangement for the diagnostic method.

FIG. 6b shows a generic scheme of the pneumatic circuit of the system, the circuit and logic implemented allowing to feed different portions of the filling unit 10 and, by means of the pilot valve 37, to engage any system/component (e.g. gaskets) separately in order to quantify directly, or by comparison and differential measures, the respectively leaks (or any other fault).

The pneumatic testing arrangement for performing on-bench measurements may envisage: an air inlet 55; the flowmeters 53, 54 arranged downstream the air inlet 55; a pilot branch 56, connecting the air inlet 55 to the pilot valve 37 of the filling unit 10 under test and equipped with a (manual or automatic) valve 58 and a pressure sensor 59; and a product branch 57, equipped with a respective (manual or automatic) valve 60 and a respective pressure sensor 61, connecting the air inlet 55 to the filling valves of the same filling unit 10 (e.g. for feeding product or gas into the fake or dummy container 51).

The flowmeters 53 and 54 are arranged before branches 56 and 57, and are used separately to measure the air flow, allowing for different measure accuracies.

As shown in FIG. 6a, processing device 28 of the diagnostic kit 20 is in this case provided with: a data acquisition device 61 for electrical connection to the air flowmeters 53, 54, optical sensor 63 and pressure sensor 52, in order to acquire measurement data; and a digital interface 62 for electrical connection to the pilot valve 37 and/or local control unit 13 of the filling unit 10, e.g. including a serial communication adapter.

Processing device 28 is designed to provide control signals to the local control unit 13 and/or pilot valve 37 of the filling unit 10, during monitoring tests and measurements, and to acquire measurement data from the monitoring sensors.

The second set 24 of monitoring instruments of the diagnostic kit 20 allows to perform detailed diagnostic tests of the filling unit 10 removed from the rotating conveyor 4, providing a deeper analysis of the operation and functionality of the valves and modules thereof (e.g. plunger, centering bell), with the aim of monitoring performance and predicting possible faults and failures.

In a possible embodiment, for each valve, leakages and speed of movement may be measured; piston seal leakages, product seal leakages and plunger speed of movement may be measured; $CO_2$ gaskets and product membrane may be tested; leaks during upwards and downwards movement of the centering bell, and speed of movements thereof, may be determined.

Figure 7:
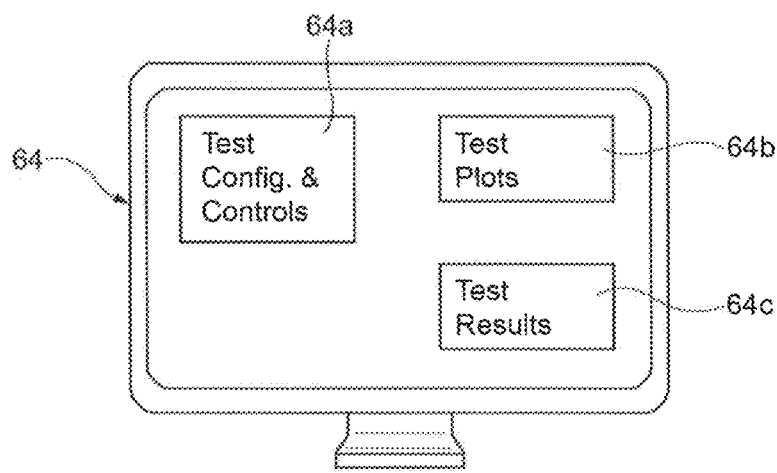
FIG. 7 schematically shows a user interface of a processing device implementing on-bench tests of the diagnostic method.

As schematically shown in FIG. 7, processing device 28 is configured to display in the user interface, here denoted with 64: a first portion 64a, allowing the user to configure and control the monitoring tests and measurements; a second portion 64b, where plots related to the measurements performed are shown; and a third portion 64c, where testing results are presented to the user.

In more details, processing device 28, implementing the first and second software applications 25, 26, is configured to perform valve pneumatic/hydraulic tests, envisaging:
execution of a testing sequence of the filling unit 10;
acquisition of corresponding pressure profiles;
visualization of the acquired profiles versus a reference profile; and
calculation of an integral error between the acquired and reference profiles.

Figure 8A:
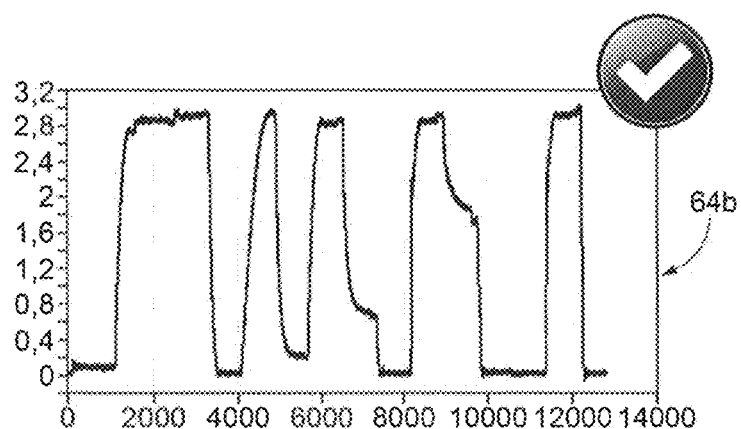
FIGS. 8a-8b, 9 and 10a-10b show plots relating to results of the monitoring tests.
Figure 8B:
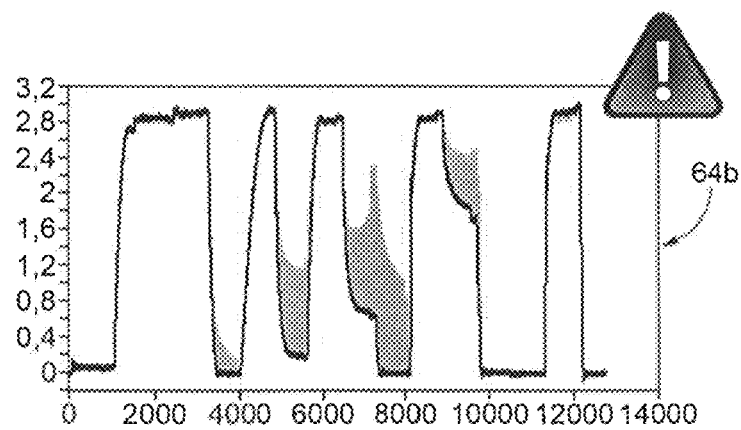

In this respect, FIG. 8a shows a first test plot, with a reference waveform and an acquired one matching perfectly (the result being indicative of a proper operation of the filling unit 10); while FIG. 8b shows a second test plot, highlighting a malfunction of the filling unit 10 under test. In particular, since the acquired curve does not reach a zero pressure point, contrary to the reference curve, the test underlines a possible malfunctioning of a depressurization element of the filling unit 10.

Processing device 28 may also be configured to calculate an integral error between the acquired curve and the reference curve.

The valve pneumatic/hydraulic tests thus allow to identify malfunctioning in the pneumatic/hydraulic operation of the filling unit 10, and also the component (or components) responsible for the fault.

Processing device 28 may also be configured to perform sealing tests, with identification and calculation of possible air leaks, using the data acquired by the first and second flowmeters 53, 54.

Figure 9:
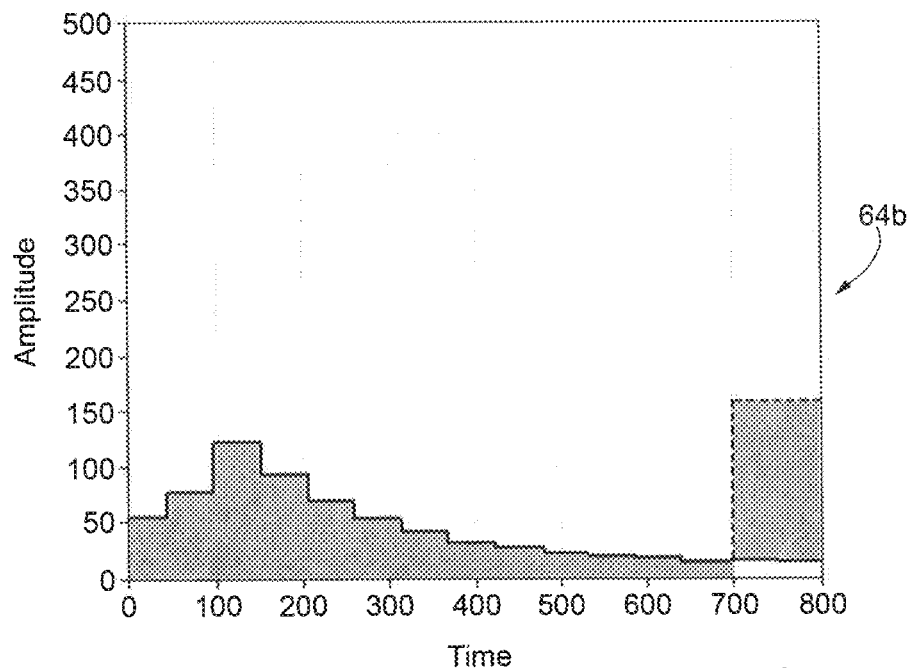

In this respect, FIG. 9 shows sealing test results, and in particular the amplitude of air losses versus time, highlighting a possible failure in a last time interval, where the amount of leakage exceeds a predetermined amount (as shown by the dashed line).

Moreover, processing device 28 may be configured to perform displacement and/or speed tests on moving components of the filling unit 10 under test, using the data acquired by the optical sensor 63.

By way of example, processing device 28 is configured to monitor the product shutter and centering bell profile and repeatability (compared to a reference).

Figure 10A:
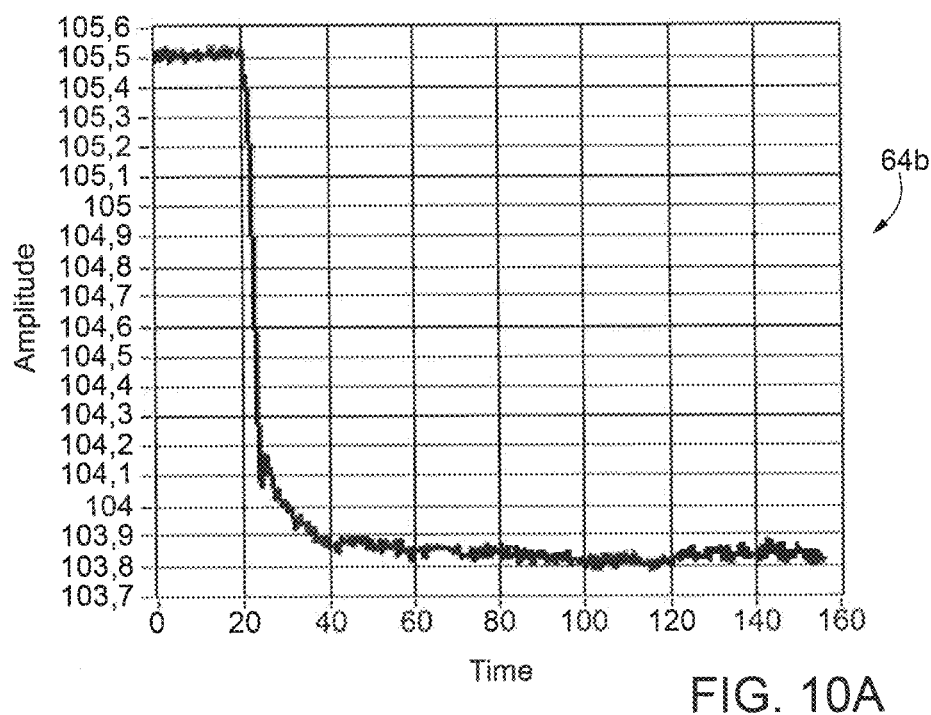
Figure 10B:
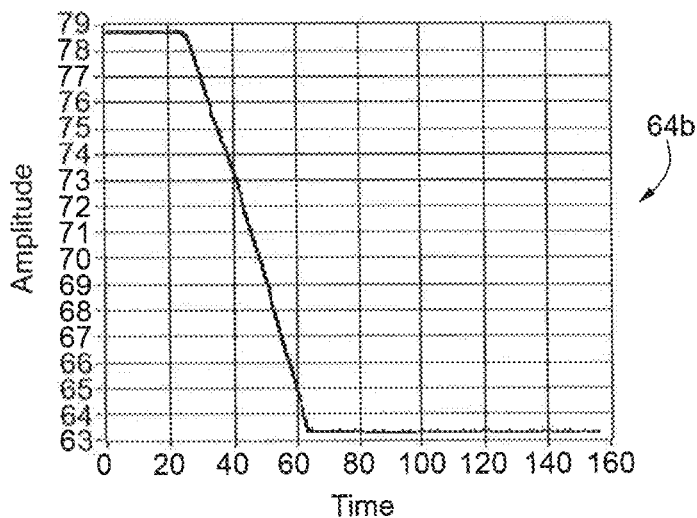

In this respect, FIG. 10a shows an acquired and monitored product shutter profile, while FIG. 10b shows an acquired centering cup profile. By the analysis of the profile it is possible to identify all the information regarding the two movements: from a stand-by position a the working position and back. For each movement, the following determinations may be made; time delay of the movement (from the input of movement and the real movement of the component), law of motion, mean time and standard deviation of the movements.

Processing device 28 may store all the acquired data and is configured to generate a test report, including the acquired and processed data, providing a complete and accurate analysis of the performance of the components of the filling unit 10. In particular, test results may provide a predictive analysis of the performance of the filling units 10 and of the possible occurrence of faults or failures, so that corrective actions may be timely performed (during maintenance or overhaul of the filling machine 1). Moreover, statistical analysis may be performed on the acquired and/or processed data, e.g. providing mean and standard deviation values, life distribution (the collection of statistical probability distributions used in reliability engineering and life data analysis) and highlighting acquired data that fall outside of a statistical range, or implementing studies on the repeatability of the measures.

Figure 11:
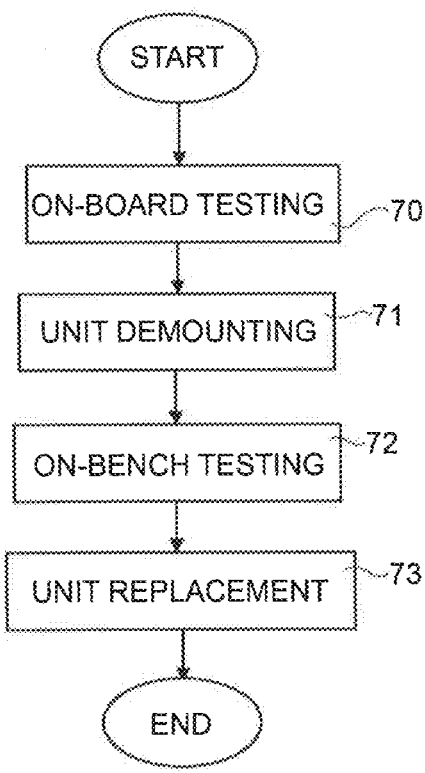
FIG. 11 is a flow chart of operations of the diagnostic method, according to an embodiment of the present solution.

FIG. 11 shows a flow chart that sums up operations performed, according to a possible embodiment of the diagnostic method, for monitoring the operating status and reliability of filling machine 1.

Starting from step 70, on-board monitoring tests and measurements are performed, in order to identify possible faults of one or more of the filling units 10 of the filling machine 1.

The measuring instruments of the first set 22 of the diagnostic kit 20 are therefore mounted on-board the filling machine 1, coupled to the existing pneumatic and electric lines and components, and filling operations are momentarily suspended in order to execute the monitoring tests.

In particular, processing device 28 bypasses the central control unit 12 of the filling machine 1 and controls execution of the tests on the filling units 10 and acquisition of the related measurements.

At the end of step 70, it is possible to identify one or more filling units 10 that do not operate properly.

Therefore, in a subsequent step 71, the one or more filling units 10 are demounted and removed from the rotating conveyor 4, conveniently being replaced by correctly operating units to allow timely restart and continuation of the filling operations.

The filling unit (s) 10 may then be tested on-bench, in step 72, in order to perform a more detailed analysis (including a predictive analysis of faults) of their operation and identify the cause(s) of malfunctioning.

In a following step 73, the same filling unit(s) 10 may be repaired and possibly re-installed on the filling machine 1, or else be discarded.

Moreover, the test results may be indicative of a required maintenance of the filling machine 1, or parts thereof; maintenance operations may thus conveniently be performed in order to prevent faults and assure correct operation of the filling machine 1.

The advantages that the described solution allows to achieve are clear from the foregoing description.

In particular, it is again underlined that the diagnostic kit and method allow to perform an accurate and reliable analysis of the operation of a container processing machine in a processing plant, starting from on-board measurements executed in the field and proceeding, if needed, to a more detailed on-bench monitoring.

Advantageously, the diagnostic kit 20 is portable and may be easily carried on site in the respective case 29, to perform all the required monitoring operations.

The discussed solution allows to measure the status of reliability of the machines during their life time, so as to; avoid machines faults; improve the overhaul efficiency; and improve the internal tests (by comparing data to references).

The discussed solution therefore allows to overcome the existing difficulties in accurately determining the status of a container processing machine and to provide quantitative measures of its performance on site, at the processing plant, since it allows to determine the exact responsible of the failure and/or predict the occurrence of faults, reducing the time required for testing, and providing a complete set of diagnostic tools to perform the analysis.

The discussed solution therefore improves machine overhaul and increases the confidence of the users in the monitoring and maintenance operations performed.

Finally, it is clear that modifications and variations may be applied to the solution described and shown, without departing from, the scope of the appended claims.

First, it is underlined that, although discussed in connection with a particular solution for monitoring filling units of a filling machine, the monitoring tests and measurements envisaged by the diagnostic kit and method are generally designed to monitor any relevant (critical) parameter of any relevant component of any container processing machine in a processing plant, with a proper choice of the sensors and tools provided for the on-board and/or on-bench diagnostic operations.

For example, the discussed solution may be used with other types of valves, such as valves actuated by linear motors, and in the case where it is required acquisition of data relating to other parameters such as temperature and electrical parameters.

Moreover, it is underlined, that, according to a different embodiment, first and second software applications 25, 26, allowing to control and manage execution of the monitoring tests and measurements, may alternatively be implemented by central control unit 12 of the container processing machine 1 under test. In other words, in a possible embodiment, the central control unit 12 is provided with a suitable testing application that may be accessed by a qualified user (e.g. a trained technician), via a suitably accessible user interface (e.g. using a password or other kind of safety measure).

Moreover, according to a possible embodiment, also the first and/or second sets of measuring instruments 22 and 24 may be installed on-board the container processing machine 1, in any suitable manner, which does not hinder normal operation of the machine; in this case, measuring instruments may be selectively enabled, just during performance of the monitoring tests and measurements.

The invention claimed is:

1. A diagnostic method for a container processing machine including a rotating conveyor, and processing units carried by the rotating conveyor and designed to engage at least one container to carry out processing operations, the method comprising:
operatively coupling a first set of monitoring sensors to the processing units on-board the processing machine to monitor relevant operating parameters;
controlling the processing units to execute test operations in lieu of processing operations;
acquiring measurement data from the first set of monitoring sensors during the test operations; and
processing the acquired measurement data to provide maintenance information on the reliability of at least one of the processing units or the processing machine, wherein acquiring measurement data and processing the acquired measurement data further comprises:
acquiring pressure profiles corresponding to the processing units on-board the processing machine;
comparing the acquired pressure profiles to a reference pressure profile; and
calculating an integral error between the acquired pressure profiles and the reference pressure profile.

2. The method according to claim 1, further including:
determining a fault in one or more of the processing units;
removing the faulty processing unit from the rotating conveyor;
operatively coupling a second set of monitoring sensors to the faulty processing unit on a test bench to monitor relevant operating parameters;
acquiring measurement data from the second set of monitoring sensors;
processing the acquired measurement data to provide further maintenance information on the reliability of at least one of the faulty processing unit or the processing machine.

3. The method according to claim 1, wherein controlling the processing units to execute the test operations in lieu of the processing operations includes, via a processing device, providing control signals to local control units of the processing units, bypassing a central control unit of the processing machine.

4. The method according to claim 1, wherein operatively coupling the first set of monitoring sensors includes mounting the first set of monitoring sensors on-board the rotating conveyor, and wherein controlling the processing units includes stopping the processing operations before performing the test operations.

5. The method according to claim 1 wherein the processing machine is a filling machine including filling units configured to fill containers with a pourable product, and wherein operatively coupling the first set of monitoring sensors includes: coupling at least one air flowmeter and at least one pressure sensor to a pneumatic line arranged between an input line and a distribution line of the filling machine feeding the filling units.

6. The method according to claim 5, wherein processing the acquired measurement data from the at least one air flowmeter and the at least one pressure sensor includes detecting possible air leaks in constituent components of the filling units.

7. The method according to claim 5, wherein operatively coupling the first set of monitoring sensors further includes: coupling at least one image or laser sensor to the filling units to monitor at least one of displacements or a corresponding speed of moving parts of the filling units.

8. The method according to claim 2, further including coupling the faulty processing unit to a test pneumatic line and executing a testing sequence on a dummy container, and wherein operatively coupling the second set of monitoring sensors to the faulty processing unit on the test bench includes coupling at least one pressure sensor, flowmeters and at least one image or laser sensor to the testing pneumatic line, in order to do at least one of determine pressure profiles or perform air leakage measurements.

9. A diagnostic kit for a container processing machine including a rotating conveyor, and processing units carried by the rotating conveyor and configured to engage at least one container to carry out processing operations the diagnostic kit comprising:
- a first set of monitoring sensors configured to be operatively coupled to the processing units on-board the processing machine to monitor relevant operating parameters; and
- a processing device configured to:
  - control the processing units to execute test operations in lieu of processing operations;
  - acquire measurement data from the first set of monitoring sensors during the test operations; and
  - process the acquired measurement data to provide maintenance information on the reliability of at least one of the processing units or the processing machine, wherein acquiring measurement data and processing the acquired measurement data further comprises:
    - acquiring pressure profiles corresponding to the processing units on-board the processing machine;
    - comparing the acquired pressure profiles to a reference pressure profile; and
    - calculating an integral error between the acquired pressure profiles and the reference pressure profile.

10. The diagnostic kit according to claim 9, further including a second set of monitoring sensors configured to be operatively coupled to a faulty processing unit on a test bench to monitor operating parameters, wherein the processing device is further configured to:
- acquire measurement data from the second set of monitoring sensors; and
- process the acquired measurement data to provide further maintenance information on the reliability of at least one of the faulty processing unit or the processing machine.

11. The diagnostic kit according to claim 9, wherein the first set and the second set of monitoring sensors are housed in a portable case.

12. The diagnostic kit according to claim 9, wherein the first set and the second set of monitoring sensors are installed on-board the processing machine.

13. The diagnostic kit according to claim 9, wherein the processing device is configured to provide control signals to local control units of the processing units, bypassing a central control unit of the processing machine, in order to execute the test operations.

14. The diagnostic kit according to claim 9, wherein the processing machine is a filling machine including filling units designed to fill containers with a pourable product, and wherein the first set of monitoring sensors includes at least one air flowmeter and at least one pressure sensor configured to be mounted on-board the rotating conveyor and coupled to a pneumatic line arranged between an input line and a distribution line of the filling machine, feeding the filling units.

15. The diagnostic kit according to claim 14, wherein the first set of monitoring sensors further includes an image sensor or laser, configured to be coupled to the filling units to monitor at least one of displacements or a corresponding speed of moving parts.

16. The diagnostic kit according to claim 10, wherein the second set of monitoring sensors includes at least one pressure sensor, flowmeters and at least one image sensor or laser configured to be coupled to the faulty processing unit on the test bench, along a testing pneumatic line.

17. A diagnostic method for a container filling machine including a rotating conveyor, and filling units carried by the rotating conveyor and configured to engage at least one container to fill the at least one container with a pourable product, the method comprising:
- operatively coupling a first set of monitoring sensors to the filling units on-board the filling machine to monitor relevant operating parameters, wherein operatively coupling the first set of monitoring sensors includes coupling at least one air flowmeter and at least one pressure sensor to a pneumatic line arranged between an input line and a distribution line of the filling machine feeding the filling units;
- controlling the filling units to execute test operations in lieu of filling operations;
- acquiring measurement data from the first set of monitoring sensors during the test operations; and
- processing the acquired measurement data to provide maintenance information on the reliability of at least one of the filling units or the filling machine, wherein acquiring measurement data and processing the acquired measurement data includes:
  - acquiring pressure profiles corresponding to the filling units on-board the filling machine;
  - comparing the acquired pressure profiles to a reference pressure profile; and
  - calculating an integral error between the acquired pressure profiles and the reference pressure profile.

18. The method according to claim 17, further comprising processing the acquired measurement data from the at least one air flowmeter and the at least one pressure sensor; and
- detecting possible air leaks in constituent components of the filling units.

19. The method according to claim 17, wherein operatively coupling the first set of monitoring sensors further includes: coupling at least one image or laser sensor to the filling units to monitor at least one of displacements or a corresponding speed of moving parts of the filling units.

20. The method according to claim 17, further comprising:
- determining a fault in one or more of the filling units;
- removing the faulty filling unit from the rotating conveyor;
- operatively coupling a second set of monitoring sensors to the faulty filling unit on a test bench to monitor relevant operating parameters;
- acquiring measurement data from the second set of monitoring sensors;
- processing the acquired measurement data to provide further maintenance information on the reliability of at least one of the faulty filling unit or the filling machine.

* * * * *